June 6, 1950  H. W. OSBURN  2,510,651
LEVERAGE SYSTEM
Filed July 10, 1944  3 Sheets-Sheet 1
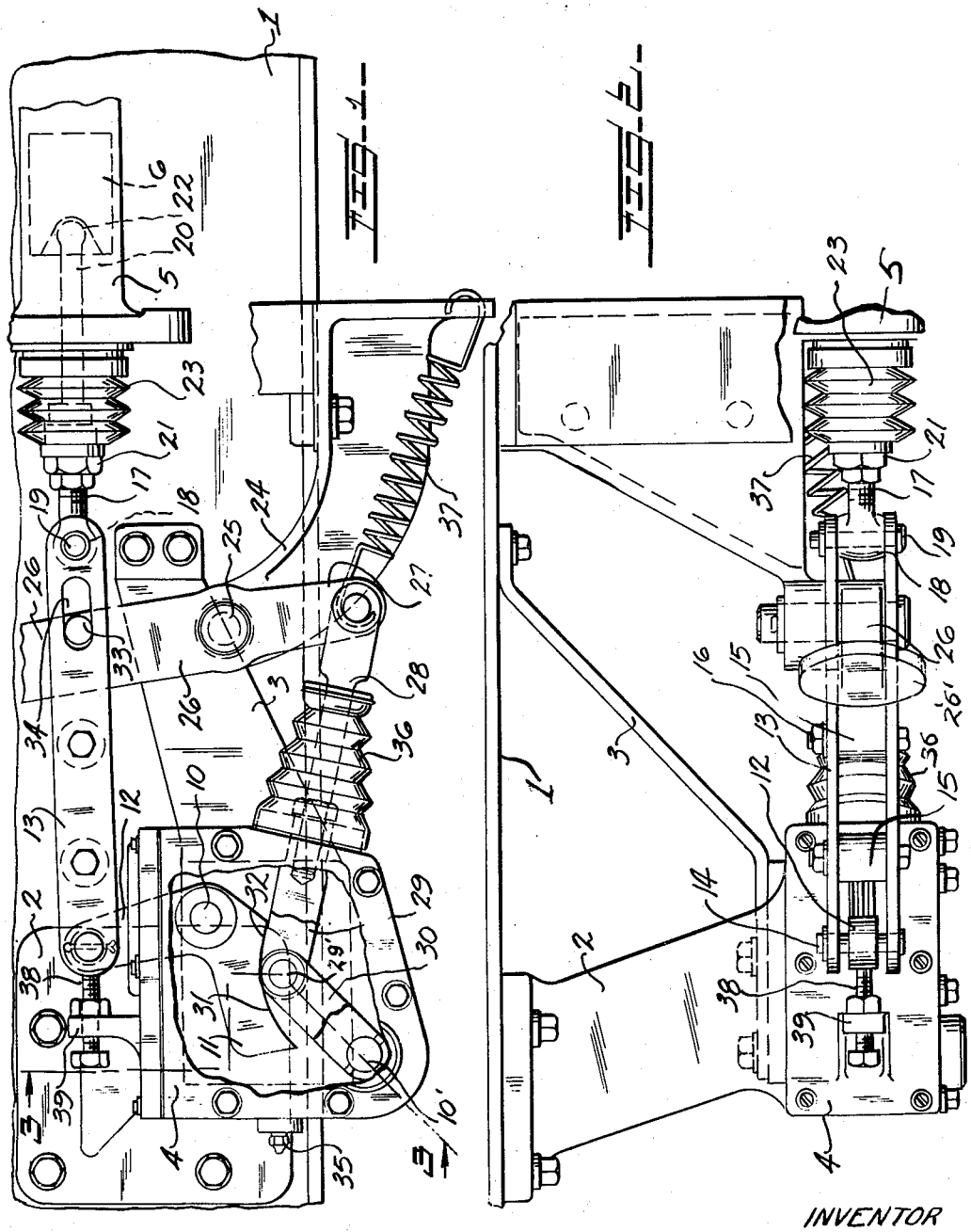
INVENTOR
Howard W. Osburn
BY
ATTORNEY

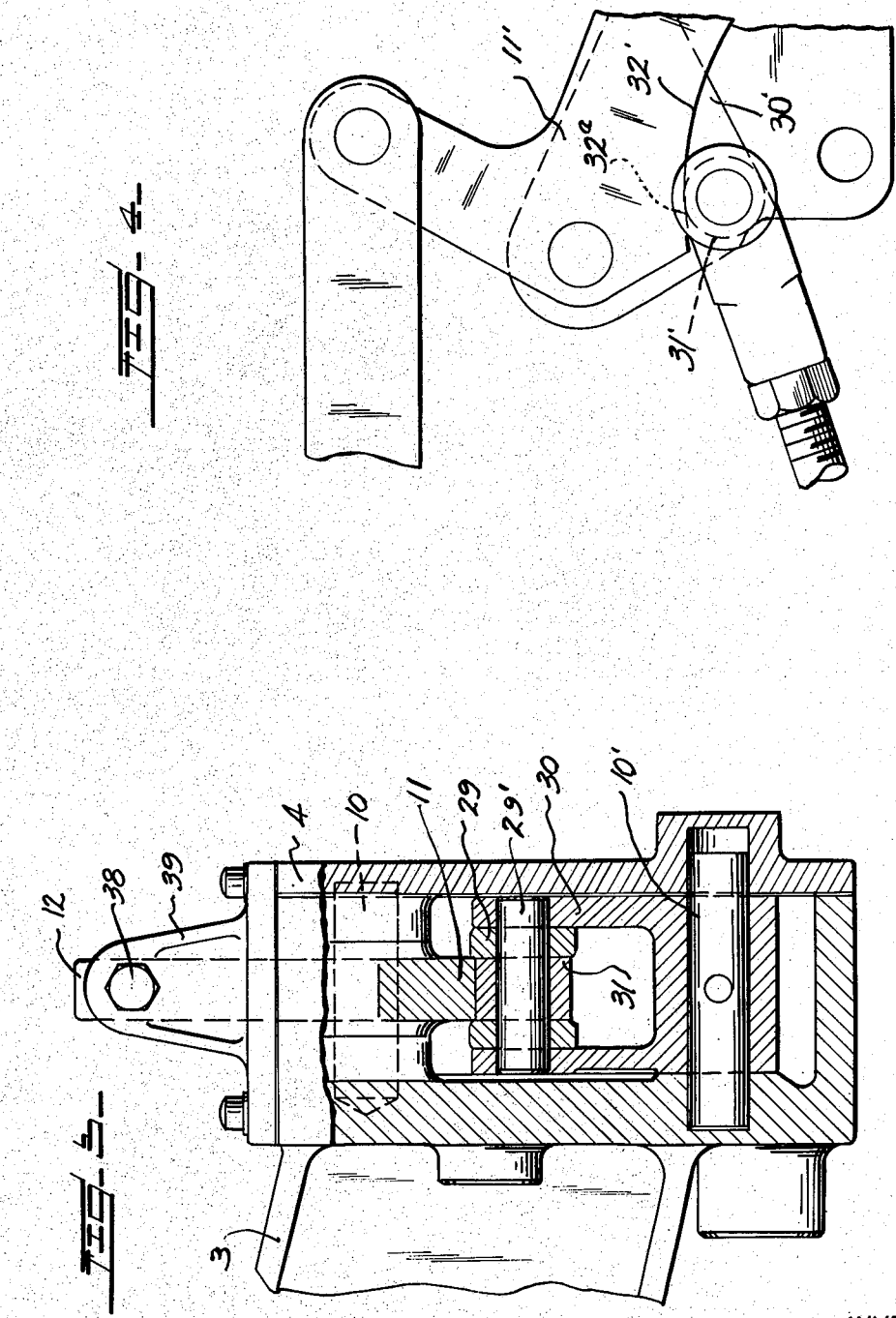

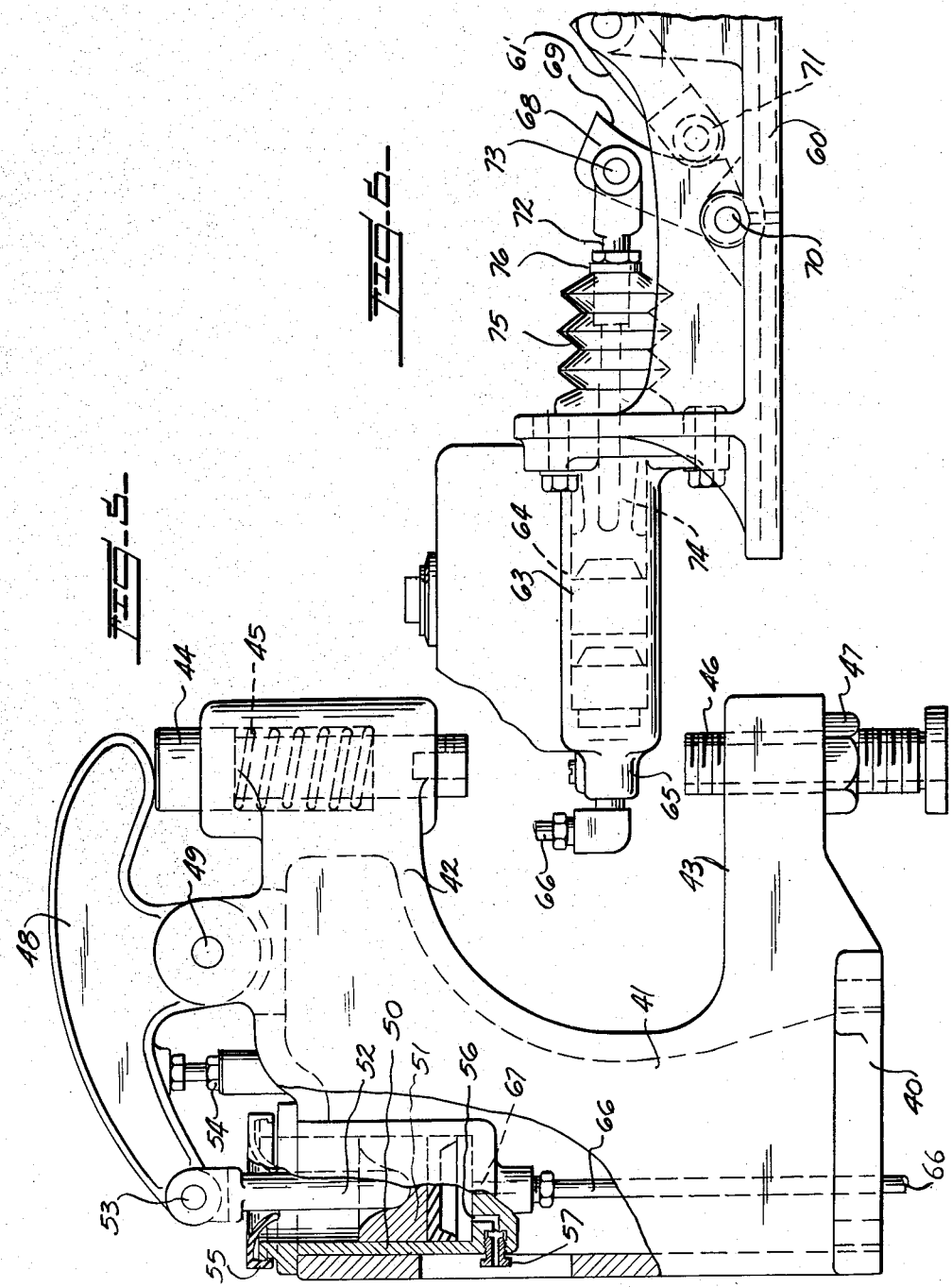

Patented June 6, 1950

2,510,651

UNITED STATES PATENT OFFICE 2,510,651

LEVERAGE SYSTEM

Howard W. Osburn, Detroit, Mich., assignor to Power Brake Parts Manufacturing and Sales Company, Detroit, Mich., a corporation of Michigan Application July 10, 1944, Serial No. 544,268

4 Claims. (Cl. 74—516)

The present invention pertains to a novel force-applying mechanism and particularly to a leverage system for operating such devices as vehicle brakes, presses and other machines operating by pressure exerted by the body of the operator.

In hydraulic brakes for trucks, for example, the physical strength of the operator alone is ordinarily insufficient for satisfactory operation, and a booster is commonly required. Various power multiplying devices not requiring a booster have been proposed, but these have required lever displacements beyond the space limitations of the vehicle or other machine equipped with the apparatus.

The principal object of the invention is to provide a force-applying mechanism requiring no booster and not subject to the described objections. Briefly, the invention includes a lever having a progressively increasing mechanical advantage by virtue of an input lever riding along one edge thereof. This edge is preferably concave, whereby the displacement of the lever is reduced and its mechanical advantage further increased. The free end of the first lever is connected to the load.

The invention is subject to various embodiments, some of which are disclosed in the following description and in the accompanying drawings in which Figure 1 is a side elevation, partly broken away, of a brake actuator;

Figure 2 is a plan view;

Figure 3 is a section on the line 3—3 of Figure 1;

Figure 4 is a detail of a modification;

Figure 5 is an elevation, partly in section, of a press embodying the invention and Figure 6 is an elevation of the actuating mechanism therefor.

Reference to these views will now be made by use of like characters which are employed to designate corresponding parts throughout.

In Figure 1 the numeral 1 designates the frame structure of a vehicle to which are attached suitable brackets 2 and 3 for supporting a brake actuating mechanism. The mechanism is contained, in part, in a housing 4 secured to the outer ends of the brackets. A master cylinder 5 is suitably supported on the vehicle and contains a piston 6 adapted to force fluid under pressure into the lines of a wheel braking system. The details of this system are not illustrated since they are already well known in the art. The invention is concerned with the actuation of the piston.

A cross shaft 10 within the housing 4 supports a bell crank lever having an input arm 11 and an output arm 12, the latter projecting through the top of the housing as shown in Figure 3. To the exposed end of the arm 12 are attached two parallel links 13 by a pin 14. The links are braced at intervals by sleeves 15 and bolts 16. Between the remaining ends of the links is pivotally attached a threaded push rod 17 by means of a head 18 thereon held by a pin 19.

A piston rod 20 is adjustably attached to the rod 18 by suitable fastenings 21 and has its free end attached in a flared socket 22 formed in the piston 6 and shaped to accommodate the varying angularity of the piston rod. A bellows 23 encloses the external part of the piston rod to prevent entrance of dust into the cylinder 5 and has its ends attached respectively to the cylinder and to the distal end of the piston rod.

Another bracket 24 secured to the frame carries an axle 25 on which is journalled a pedal lever of high mechanical advantage having a long input arm 26 with pedal 26' and a short output arm 27. To the output arm is pivotally attached a threaded rod 28 on which, in turn, is adjustably mounted a forked link 29. In the lower part of the housing 4 is mounted a pin 10', on which is journalled another forked link 30 with its free end straddling the free end of the link 29. Both free ends support and are joined by pin 29' carrying a roller 31 that rides on a developed cam edge 32 formed on the arm 11.

The links 13 are maintained in a substantially rectilinear path by a pin 33 carried by the lever arm 26 and received in slots 34 in the links. The housing 4 is supplied with lubricant through a fitting 35, and leakage around the link 29 is arrested by a bellows 36 fastened to the housing 4 and to a remote point on the rod 28.

The pedal lever is normally retracted by a spring 37 joining the arm 27 to the bracket 24. The corresponding movement of the links 13 is adjustably limited by a screw 38 mounted in a lug 39 on the housing 4 and engageable by the exposed end of the arm 12.

In the embodiment shown in Figure 1, the initial position of the roller 31 is approximately midway between the ends of the cam edge 32. As the pedal 26' on lever 26 is depressed, the roller is guided in the arc of link 30 and moved away from the fulcrum, thereby progressively increasing the mechanical advantage of the bell crank lever. Due to the concavity of the cam edge 32, the displacement of the arm 11 is less than if the edge were straight, and the mechanical advantage is thereby increased still further. The result is that the mechanical advantage reaches its maximum value when the fluid braking pressure in the master cylinder 5 has been developed to its highest point. The displacement of the pedal 26' is conventional, and within this range a sufficient braking pressure for a truck can be developed without a booster and without unwieldy lever lengths.

In Figure 4, the roller 31' is guided on an inclined plane 30' rather than in an arc by a link. The initial position of the roller is nearer the fulcrum of the arm 11', illustrating in one respect the variability of design for different installations. As a further variant, the initial portion 32a of the cam edge 32' is a straight line for approximately 22° on the prolongation of the arcuate cam edge, since the increased mechanical advantage of a concave edge is not needed in the initial movement of the lever and master cylinder piston, where the braking pressure is at its minimum.

Figures 5 and 6 show the invention applied to a machine of the press type such as a punch, straightening press, riveter or the like. The machine, shown as a bench model, comprises a base 40 on which is erected a column 41 formed with jaws 42, 43. In the upper jaw 42 is slidably mounted a plunger 44 held in its upper position by a spring 45. In the lower jaws is a threaded, adjustable supporting column 46 locked by a nut 47. The plunger 44 is actuated by a rocker 48 pivotally mounted at 49 on the jaw 42, and the rocker is actuated by the means that will now be described.

In the column 41 is mounted a cylinder 50 containing a piston 51. A piston rod 52 is loosely received in the top of the piston and has its upper end pivoted at 53 to the rear end of the rocker 48. The spring 45 tends to depress the piston rod, and this movement is limited by an adjustable bolt 54 mounted upon the jaw 42. The top of the cylinder 50 is sealed by a rubber cover 55 that hugs the piston rod. At the base of the cylinder is a passage 56 adapted to be uncovered by a ported bleeder screw 57.

On the floor, or conveniently beneath the head of the machine, is provided a mounting bracket 60 to which is pivotally attached a pedal lever 61. The lever carries an adjustable stop screw 62 adapted to strike against the bracket. To the bracket is also secured a hydraulic master cylinder 63 of known design and containing a piston 64. The outlet 65 of the cylinder 63 is connected by a pipe 66 to a port 67 in the bottom of the cylinder 50.

A cam lever 68, with a concave cam edge 69, is pivotally mounted at 70 on the bracket 60 between the lever 61 and the cylinder 63. The short output arm 61' of the lever 61 carries a roller 71 engaging the edge 69. An adjustable piston rod 72 is pivoted to the free end of the lever 68, at 73, and is loosely received in a socket 74 in the piston 64. A sealing bellows 75 is fastened to the cylinder 63, enclosing the adjacent external portion of the piston rod and secured thereto at 76.

In operation, the mechanical advantage of the system progressively increases as the roller 71 approaches the end of its power stroke. As in the braking system, the mechanical advantage is relatively low at the beginning of the power stroke and reaches its maximum when the load is greatest. A high leverage multiplication is derived notwithstanding the relatively short travel of the power input member.

In each of the embodiments of the invention, the first portion of the power stroke is similar to a cam action. In the latter portion of the stroke, the power multiplication is so high that it has the effect of a wedge action.

Although specific embodiments of the invention have been illustrated and described, it will be understood that various alterations in the details of construction may be made without departing from the scope of the invention, as indicated by the appended claims.

What I claim is:

1. A force-applying mechanism comprising a substantially right angular bell crank lever having a fixed fulcrum and an outer developed cam edge on one leg, another lever having a fixed fulcrum and one end adapted to ride along said edge to actuate the first lever, a rod pivotally attached to the second lever and lying entirely at one side of the longitudinal axis of said leg having the cam edge, a force-applying arm having an intermediate fulcrum and one end pivotally connected to said rod, and linkage connected to the other leg of said bell crank lever.

2. A force-applying mechanism comprising an output lever, a push rod having an end adapted to ride along said lever to actuate the same, means for guiding said end, an actuating lever connected to said rod, a load member connected to the free end of the first lever, and means on the second lever for guiding said member.

3. A force-applying mechanism comprising an output lever, a push rod having an end adapted to ride along said lever to actuate the same, means for guiding said end, an actuating lever connected to said rod, a load member connected to the free end of the first lever, and a slot-and-pin connection between said member and the second lever for guiding said member.

4. A force-applying mechanism comprising an output lever having a concave edge, a push rod having an end adapted to ride along said edge to actuate the lever, means for guiding said end, an actuating lever connected to said rod, a load member connected to the free end of the first lever, and means on the second lever for guiding said member.

HOWARD W. OSBURN.

REFERENCES CITED

The following references are of record in the file of this patent:

UNITED STATES PATENTS

| Number | Name | Date |
|---|---|---|
| 688,351 | Skidmore | Dec. 10, 1901 |
| 1,584,931 | Handy et al. | May 18, 1926 |
| 1,814,632 | Rohr | July 14, 1931 |
| 1,887,845 | Mitchell | Nov. 15, 1932 |
| 2,162,133 | Spire | June 13, 1939 |
| 2,310,625 | Fischer | Feb. 9, 1943 |
| 2,350,002 | Sittert et al. | May 30, 1944 |
| 2,351,049 | Kaman | June 13, 1944 |